United States Patent
Hamaguchi et al.

(10) Patent No.: US 10,449,455 B2
(45) Date of Patent: Oct. 22, 2019

(54) OPERATION INFORMATION MEASUREMENT APPARATUS, GAME CONTROL PROGRAM, OPERATION INFORMATION MEASUREMENT PROGRAM

(71) Applicant: OMRON HEALTHCARE CO., LTD., Muko-shi, Kyoto (JP)

(72) Inventors: Takehiro Hamaguchi, Kyoto (JP); Yumi Kitamura, Kyoto (JP)

(73) Assignee: OMRON HEALTHCARE CO., LTD., Muko (JP)

( * ) Notice: Subject to any disclaimer, the term of this patent is extended or adjusted under 35 U.S.C. 154(b) by 395 days.

(21) Appl. No.: 15/417,923

(22) Filed: Jan. 27, 2017

(65) Prior Publication Data
US 2017/0136361 A1 May 18, 2017

Related U.S. Application Data

(63) Continuation of application No. PCT/JP2015/073439, filed on Aug. 20, 2015.

(30) Foreign Application Priority Data

Aug. 29, 2014 (JP) ................. 2014-175836

(51) Int. Cl.
*A63F 13/58* (2014.01)
*A63F 13/211* (2014.01)
(Continued)

(52) U.S. Cl.
CPC ............ *A63F 13/58* (2014.09); *A63F 13/211* (2014.09); *A63F 13/212* (2014.09);
(Continued)

(58) Field of Classification Search
CPC ...... A63F 13/58; A63F 13/424; A63F 13/215; A63F 13/211; A63F 13/212; A63F 13/825; A63F 2300/105
See application file for complete search history.

(56) References Cited

FOREIGN PATENT DOCUMENTS

| CN | 1397904 A | 2/2003 |
|---|---|---|
| CN | 103371806 A | 10/2013 |

(Continued)

OTHER PUBLICATIONS

Sep. 29, 2015 International Search Report issued in Patent Application No. PCT/JP2015/073439.

(Continued)

*Primary Examiner* — Kevin Y Kim
(74) *Attorney, Agent, or Firm* — Oliff PLC

(57) ABSTRACT

An operation information measurement apparatus includes: a detection unit that detects information corresponding to a motion of a user; an activity amount measurement unit that measures an activity amount of the user based on the information detected by the detection unit; an action identification unit that identifies an action of the user based on the information detected by the detection unit; and a transfer unit that transfers pattern information relating to a pattern of the action of the user identified by the action identification unit and the activity amount of the user measured by the activity amount measurement unit to a game control unit that controls a parameter of an electronic game based on the activity amount and the pattern information.

7 Claims, 4 Drawing Sheets

REFERENCE ACTION PATTERN

▨ SLEEP PERIOD
▩ STUDY PERIOD

(51) Int. Cl.
*A63F 13/825* (2014.01)
*A63F 13/212* (2014.01)
*A63F 13/215* (2014.01)
*A63F 13/424* (2014.01)

(52) U.S. Cl.
CPC .......... *A63F 13/215* (2014.09); *A63F 13/424* (2014.09); *A63F 13/825* (2014.09); *A63F 2300/105* (2013.01)

(56) References Cited

FOREIGN PATENT DOCUMENTS

| | | | |
|---|---|---|---|
| JP | 2003-154168 | A | 5/2003 |
| JP | 3131833 | U | 5/2007 |
| JP | 2008-289583 | A | 12/2008 |
| JP | 2012-128750 | A | 7/2012 |
| JP | 2013-509205 | A | 3/2013 |

OTHER PUBLICATIONS

Apr. 1, 2019 Office Action issued in Chinese Patent Application No. 201580043857.4.

FIG. 2A
REFERENCE ACTION PATTERN
FIG. 2B
IDENTIFIED ACTION PATTERN
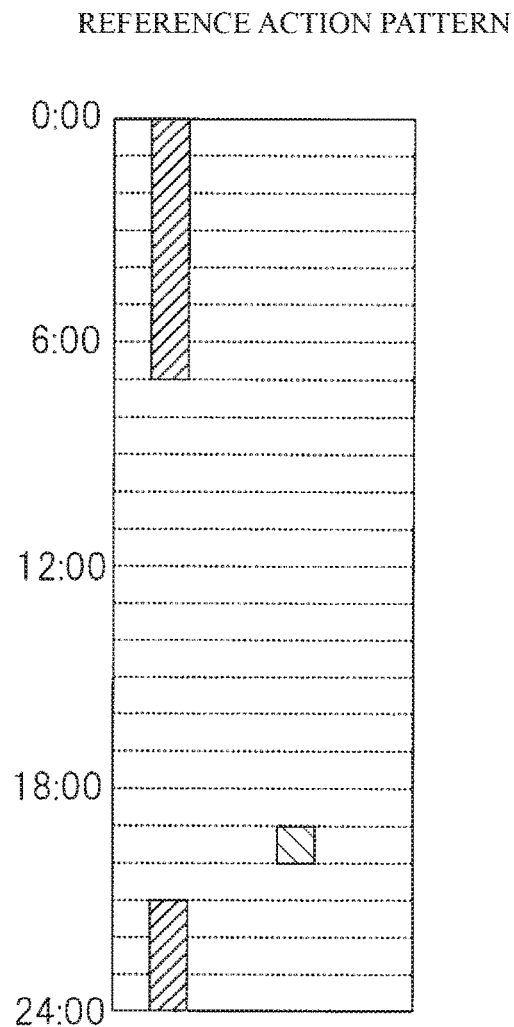
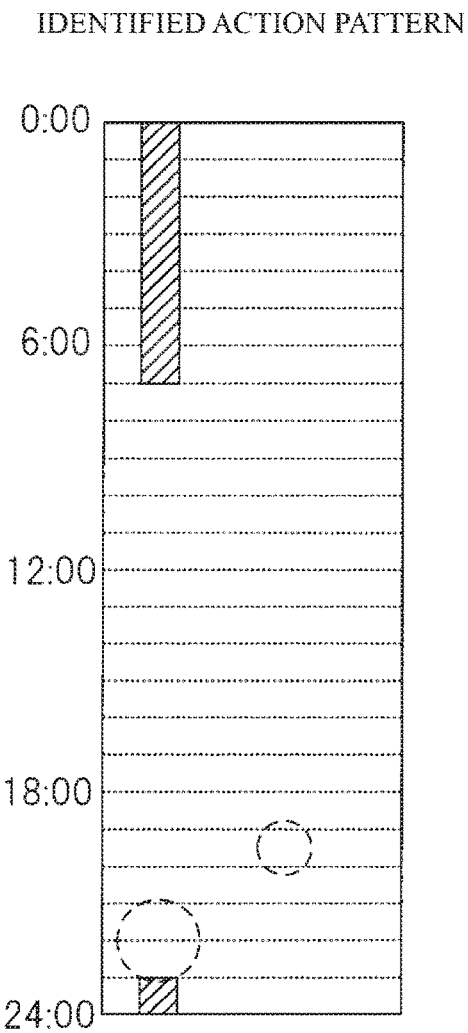

OPERATION INFORMATION MEASUREMENT APPARATUS, GAME CONTROL PROGRAM, OPERATION INFORMATION MEASUREMENT PROGRAM

TECHNICAL FIELD

The present invention relates to an operation information measurement apparatus, a game control program, and an operation information measurement program.

BACKGROUND ART

In recent years, operation information measurement apparatuses that can identify an action of a person (walking, running, going up or down stairs, sleeping, or the like) or measure an activity amount (number of steps, walking distance, expended calories, or the like) by using a motion detecting sensor that detects bodily motion, such as an acceleration sensor or an angular velocity sensor, have been actively developed. In the present specification, information on an action type and an activity amount is collectively referred to as operation information.

An operation information measurement apparatus presents operation information to a user so as to promote a desire to manage the health of the user, and it is desirable that it is used continuously every day. In view of this, it has been proposed that promotion of use of the apparatus is achieved by using the operation information in a game.

For example, Patent Literature 1 discloses a pedometer that causes a character to grow according to the number of steps of the user. With this pedometer, when the user reaches a goal by walking as much as he or she can, the character suddenly changes and grows larger.

Patent Literature 2 discloses a system for generating an avatar on which an action pattern of the user is reflected.

Patent Literature 3 discloses a system in which an electronic pet is raised according to an action pattern of the user. With this system, if the lifestyle of the user becomes irregular, the electronic pet will become sick to promote a regular lifestyle to the user.

CITATION LIST

Patent Literature

Patent Literature 1: JP 2003-154168A
Patent Literature 2: JP 2012-128750A
Patent Literature 3: JP 2008-289583A

SUMMARY OF INVENTION

Technical Problem

With the pedometer disclosed in Patent Document 1, the more the user walks, the larger the character grows. If the user is a child, it is conceivable that he or she will reduce sleeping time or studying time, for example, to earn a higher number of steps, and there is a risk that this can inhibit normal growth of the child.

With the system disclosed in Patent Document 3, if the lifestyle of the user is regular, the electronic pet will not become sick. For this reason, an effect of promoting normal growth of a child can be expected. However, if the electronic pet only becomes healthy due to the user making his or her lifestyle pattern regular, it is difficult to improve the user's desire to exercise. Also, even if the user leads a regular lifestyle, it cannot be said that his or her lifestyle is healthy if he or she does not communicate with anyone.

The present invention has been made in view of the foregoing circumstances, and it is an object thereof to provide an operation information measurement apparatus that can improve a user's desire for activity and promote a regular lifestyle to the user.

Solution to the Problem

An operation information measurement apparatus according to the present invention includes: a detection unit configured to detect information corresponding to a motion of a user; an activity amount measurement unit configured to measure an activity amount of the user; an action identification unit configured to identify an action of the user based on the information detected by the detection unit; and a transfer unit configured to transfer pattern information relating to a pattern of the action of the user identified by the action identification unit and the activity amount of the user measured by the activity amount measurement unit to a game control unit configured to control a parameter of an electronic game based on the activity amount and the pattern information.

A game control program according to the present invention is a program for causing a computer to function as the game control unit.

An operation information measurement program according to the present invention is a program for causing a computer to function as the activity amount measurement unit, the action identification unit, and the transfer unit in the operation information measurement apparatus.

Advantageous Effects of Invention

According to the present invention, it is possible to provide an operation information measurement apparatus that can improve a user's desire for activity, and promote a regular lifestyle to the user.

BRIEF DESCRIPTION OF DRAWINGS

FIGS. 2A and 2B are diagrams for illustrating a reference action pattern registered in an operation information measurement apparatus 10 and an action pattern identified by the operation information measurement apparatus 10.

DESCRIPTION OF EMBODIMENTS

Hereinafter, an embodiment of the present invention will be described with reference to the drawings.

Figure 1:
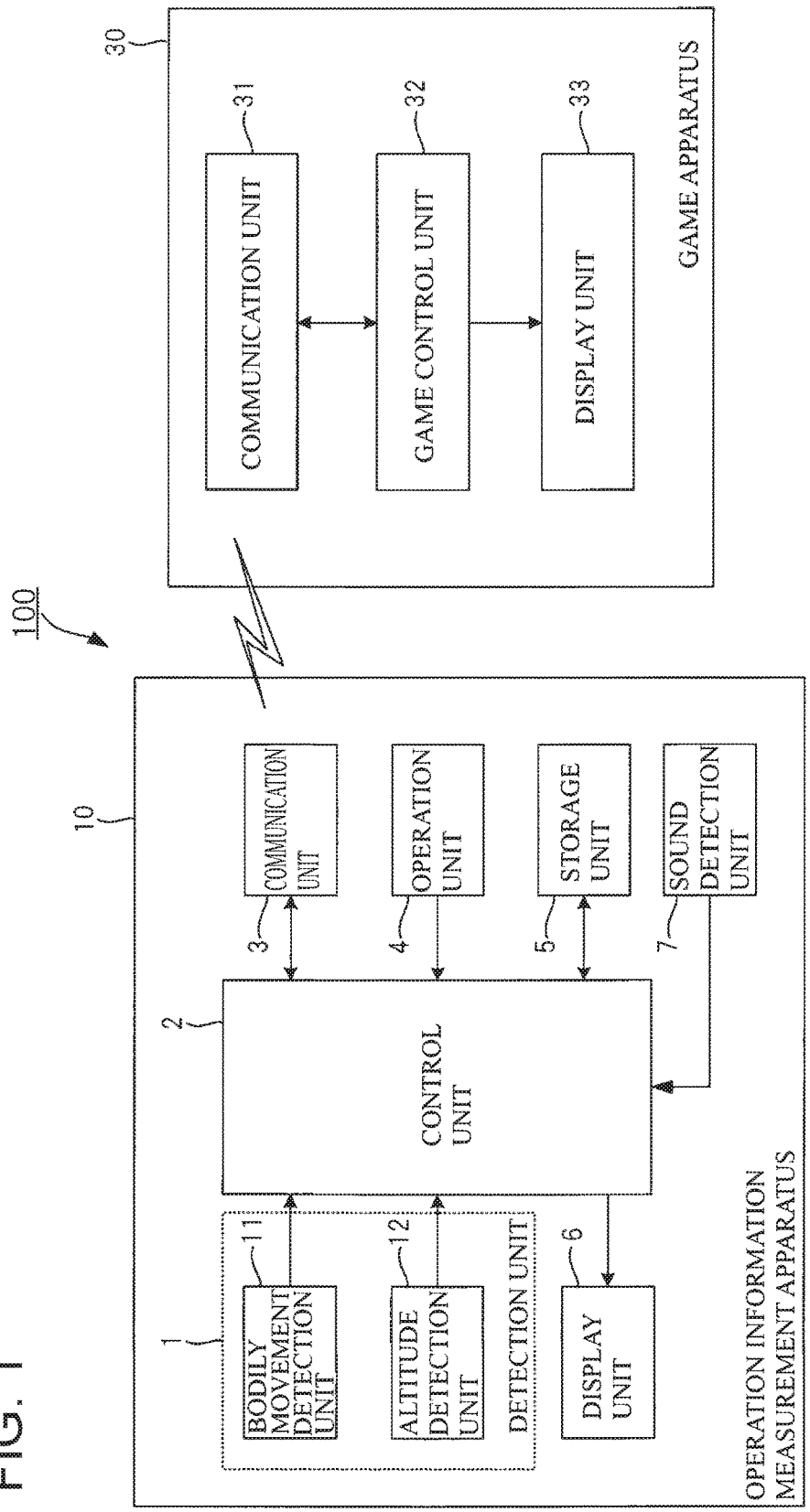
FIG. 1 is a block diagram showing an overall configuration of a system 100 for describing an embodiment of the present invention.

FIG. 1 is a diagram showing an overall configuration of a system 100 for describing an embodiment of the present invention. The system 100 includes an operation information measurement apparatus 10 and a game apparatus 30. The operation information measurement apparatus 10 is used while worn on the body of a user.

The operation information measurement apparatus 10 includes a detection unit 1, a control unit 2 that performs overall control of the entire apparatus, a communication unit 3, an operation unit 4, a storage unit 5 including a storage medium such as a flash memory or a ROM (Read Only Memory), a display unit 6 for displaying various types of information, and a sound detection unit 7.

The detection unit 1 detects information corresponding to the motion of a site on the body of the user on which the operation information measurement apparatus 10 is worn, and includes a bodily movement detection unit 11 and an altitude detection unit 12.

The bodily movement detection unit 11 detects the motion (acceleration, angular velocity, etc.) of the site on the body of the user on which the operation information measurement apparatus 10 is worn, and includes various sensors such as an acceleration sensor and an angular velocity sensor, and a signal processing unit that processes signals output from the various sensors. The bodily movement detection unit 11 need only include at least one motion sensor and a signal processing unit that processes a signal from that motion sensor.

The altitude detection unit 12 includes an air pressure sensor, and processes a detection signal from the air pressure sensor to detect the altitude of the site on which the operation information measurement apparatus 10 is worn. Note that the altitude detection unit 12 may be omitted. The altitude of the site on which the operation information measurement apparatus 10 is worn changes due to the movement of the user (e.g., going up or down stairs). Accordingly, the information on the altitude is also information corresponding to the motion of the site on which the operation information measurement apparatus 10 is worn.

The control unit 2 is mainly constituted by a processor that executes an operation information measurement program stored in the ROM of the storage unit 5.

The communication unit 3 is an interface for performing communication with other electronic devices, including the game apparatus 30. A communication interface conforming to ANT, a communication interface conforming to WIFI, a communication interface conforming to Bluetooth, or the like is used as such an interface. Also, the communication unit 3 may be configured to be able to communicate with the game apparatus 30 via a network such as the Internet.

The operation unit 4 is a device for inputting various types of instructions to the control unit 2, and is constituted by buttons, a touch panel mounted on the display unit 6, and the like.

The storage unit 5 stores detection information detected by the detection unit 1, stores information received via the communication unit 3, and stores information needed for the operation of the operation information measurement apparatus 10. A reference action pattern that is to serve as a model for the user is stored in the storage unit 5. The reference action pattern is data that designates time slots in a day in which at least one specific action such as sleeping or studying is to be performed.

FIG. 2A is a diagram for illustrating an example of a reference action pattern. FIG. 2A shows an example of data that is divided into 24 blocks that represent one day (0:00 to 24:00), and in these 24 blocks, 21:00 to 7:00 the next morning is designated as a sleep period during which sleeping, which is a specific action, is to be performed, and 19:00 to 20:00 is designated as a study period during which studying, which is a specific action, is to be performed.

As this kind of reference action pattern, a fixed reference action pattern that is determined in advance may be used, or the reference action pattern may be selected manually out of multiple patterns determined in advance. Alternatively, the reference action pattern may be set manually by operating the operation unit 4. In the case of manually setting the reference action pattern, a configuration may be used in which the reference action pattern is set in an application with another electronic device (e.g., a smartphone) capable of communicating with the operation information measurement apparatus 10 and the setting data is transmitted from the electronic device to the operation information measurement apparatus 10 and stored in the storage unit 5.

The sound detection unit 7 detects sound in the periphery of the operation information measurement apparatus 10, and is constituted by a microphone, for example.

The game apparatus 30 includes a communication unit 31, a game control unit 32, and a display unit 33.

The communication unit 31 is an interface for communicating with the communication unit 3 of the operation information measurement apparatus 10.

The game control unit 32 is constituted by a processor with a built-in memory. A game program (including a game control program) is stored in the memory. The processor executes the game program to cause a game screen to be displayed on the display unit 33, whereby an electronic game that can be played on the game screen is provided.

Examples of the provided electronic game include a role playing game in which a character is operated and caused to grow in order to advance a story, a battling game of battling using a character, a pet-raising game that is enjoyed by causing an electronic pet to grow, or a game in which points or the like are accumulated to clear stages or to become qualified to apply for prizes. The electronic games mentioned here are examples, and there is no limitation thereto.

Based on information on the activity amount of the user and information relating to the pattern of actions of the user, which are transferred from the operation information measurement apparatus 10 via the communication unit 31, the game control unit 32 controls a parameter in the electronic game executed based on the game program. These pieces of information will be described later.

The game apparatus 30 may be a game-dedicated device, or an electronic device with a main function other than that of a game, such as a smartphone.

Figure 3:
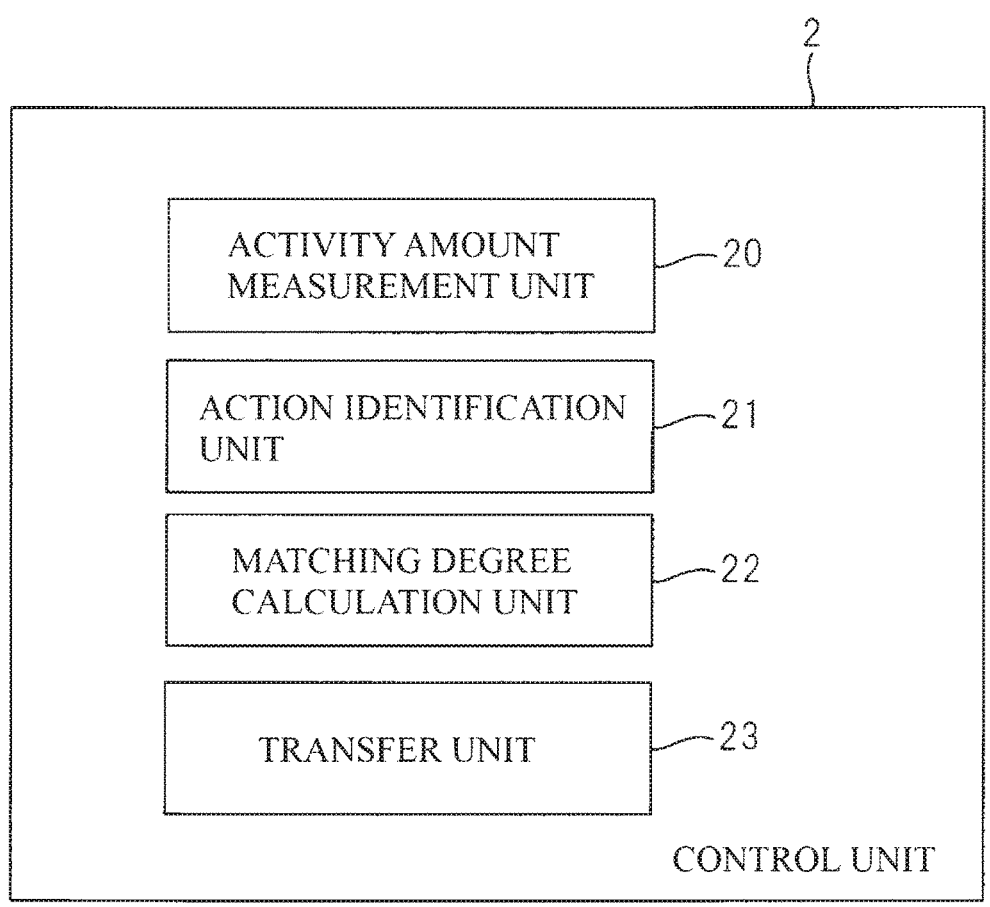
FIG. 3 is a diagram showing functional blocks of a control unit 2 of the operation information measurement apparatus 10 shown in FIG. 1.

FIG. 3 is a diagram showing functional blocks realized by the control unit 2 due to a processor executing a program stored in a storage unit 5 of an operation information measurement apparatus 10 shown in FIG. 1.

As shown in FIG. 3, the control unit 2 includes an activity amount measurement unit 20, an action identification unit 21, a matching degree calculation unit 22, and a transfer unit 23.

The activity amount measurement unit 20 measures an activity amount of the user based on detection information detected by the detection unit 1. The activity amount is information relating to an amount of activity of a person, such as the number of steps, walking distance, or expended calories. Instead of measuring the activity amount based on the detection information, the activity amount measurement unit 20 may measure a conversation amount as the activity amount by analyzing voice information detected by the sound detection unit 7.

For example, the voice of the user can be registered in advance in the storage unit 5. The activity amount measurement unit 20 counts the number of instances in which the voice information detected by the sound detection unit 7 matches the voice information of the user registered in the storage unit 5, and then calculates the counted number of instances as the conversation amount. The conversation amount may be the total value of the amount of time for which the voice information of the user is detected.

The action identification unit 21 identifies an action of the user based on the detection information detected by the detection unit 1. The action identification unit 21 may identify the action of the user by using the voice information detected by the sound detection unit 7, in addition to the detection information detected by the detection unit 1. This makes it possible to increase the accuracy of identifying the action of the user.

For example, in the case of identifying a state in which the user is studying while seated and a state in which the user is eating while seated, there is a possibility that erroneous identification will occur if only the detection information corresponding to the motion of the user is used. If the voice information is used as well, it is possible to identify eating and studying with a higher accuracy since eating is often done while conversing with family and studying is often done alone in silence.

Note that in the present specification, an action refers to an operation state of a person, such as walking, running, sitting, standing, going up or down stairs, sleeping, studying, or eating. For example, going up or down stairs can be identified by a change in the altitude information detected by the altitude detection unit 12. States such as walking, running, sitting, standing, and sleeping can be identified using information detected by the bodily movement detection unit 11, for example.

The matching degree calculation unit 22 calculates a degree of matching in accordance with the amount of overlap between a period of a specific action included in the reference action pattern stored in the storage unit 5 and a period of the specific action included in the user's action pattern (hereinafter also referred to as "identified action pattern") that was identified by the action identification unit 21.

Hereinafter, an example of a method for calculating the degree of matching will be described.

For example, a case in which the pattern of actions of the user identified by the action identification unit 21 is that shown in FIG. 2B will be described. Upon comparing FIG. 2A and FIG. 2B, the sleep periods partially overlap but do not completely overlap in the reference action pattern and the identified action pattern. Also, the study period is not present in the identified action pattern.

Letting "100" be the number of points in the case where the periods of actions in the reference action pattern and the periods of those actions in the identified action pattern completely match, the maximum number of points is allocated equally to the sleep period and the study period, and thus 50 points is allocated to each period. The matching degree calculation unit 22 obtains an overlap amount of a period of an action in the identified action pattern with respect to the period of that action in the reference action pattern, and based on this overlap amount, corrects the maximum number of points allocated to the action to calculate the number of points for the action. Then, the number of points obtained by adding together the number of points calculated for the actions is divided by 100, and the resulting value is used as the degree of matching.

Specifically, the matching degree calculation unit 22 uses the arithmetic operation (length of study period in identified action pattern that overlaps with study period in reference action pattern)/(length of study period in reference action pattern) to obtain the overlap amount between the study period in the reference action pattern and the study period in the identified action pattern. In the example shown in FIGS. 2A and 2B, the arithmetic operation (0/1) results in an overlap amount of "0", and therefore the number of points for the study period is 50×0="0".

Also, the matching degree calculation unit 22 uses the arithmetic operation (length of sleep period in identified action pattern that overlaps with sleep period in reference action pattern)/(length of sleep period in reference action pattern) to obtain the overlap amount between the sleep period in the reference action pattern and the sleep period in the identified action pattern. In the example shown in FIGS. 2A and 2B, the arithmetic operation (8/10) results in an overlap amount of "0.8", and therefore the number of points for the sleep period is 50×0.8="40". Then, the number of points (0 points) for the study period and the number of points (40 points) for the sleep period are added together to obtain "40", which is divided by "100" to obtain "0.4", which is calculated as the degree of matching.

Alternatively, letting "1" be the maximum number of points for the degree of matching, for each action included in the reference action pattern, a misalignment amount (units: hours) of the period of that action in the identified action pattern is divided by 24 hours, and the resulting value is obtained as deduction point information. Then, an integrated value of the deduction point information is subtracted from "1", and the resulting value may be set as the degree of matching.

In the example shown in FIGS. 2A and 2B, the deduction point information for the sleep period is "2/24", and the deduction point information for the study period is "1/24", and therefore the degree of matching is 1−{(1/24)+(2/24)}=0.875.

Also, the matching degree calculation unit 22 may divide the number of actions in the identified action pattern that completely match the actions in the reference action pattern by the total number of actions set in the reference action pattern, and set the resulting value as the degree of matching.

The transfer unit 23 transfers information on the user's activity amount measured by the activity amount measurement unit 20 and information on the degree of matching calculated by the matching degree calculation unit 22, to the game control unit 32 of the game apparatus 30 via the communication unit 3. Then, the game control unit 32 of the game apparatus 30 controls a parameter of the electronic game based on the information on the activity amount and the information on the degree of matching transferred from the transfer unit 23. Specifically, the game control unit 32 sets the parameter of the electronic game according to the transferred activity amount and corrects the set parameter based on the transferred degree of matching.

The information on the degree of matching calculated by the matching degree calculation unit 22 is a value that is uniquely determined according to the pattern of the actions of the user identified by the action identification unit 21. For this reason, the information on the degree of matching can be said to be information relating to the pattern (information correlated to the pattern) of the actions of the user identified by the action identification unit 21.

An operation of the system 100 configured as described above will be described.

Figure 4:
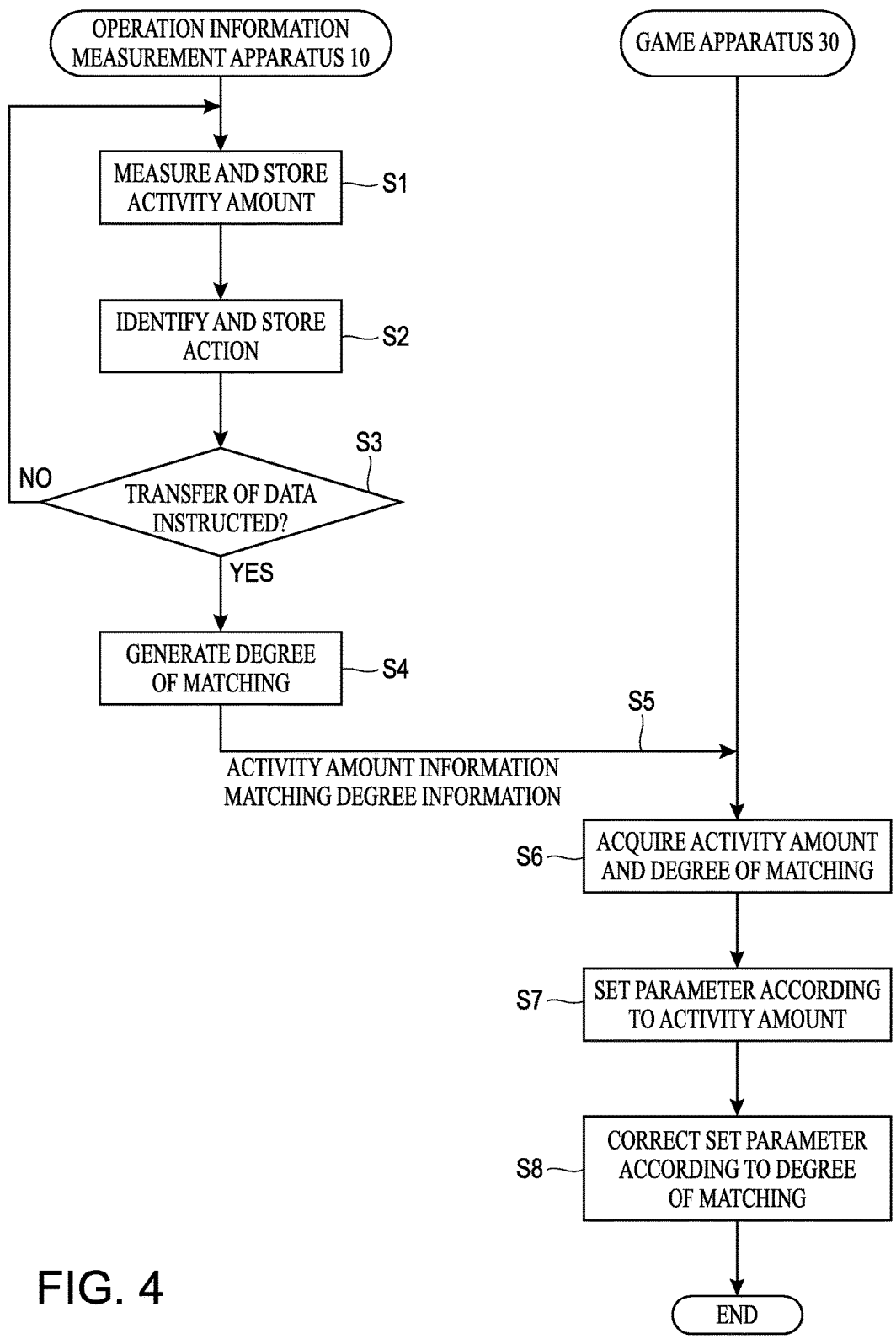
FIG. 4 is a flowchart for illustrating an operation of the system 100 shown in FIG. 1.

FIG. 4 is a flowchart for illustrating an operation of the system 100. Hereinafter, description will be given assuming that the game apparatus 30 provides an electronic game in which a character is raised.

When the user is active while wearing the operation information measurement apparatus 10, an activity amount is measured by the control unit 2, and the activity amount is stored in the storage unit 5 (step S1). Also, the user's action is identified by the control unit 2, and the action type and information on the amount of time for which the action is performed are stored in association with each other in the storage unit 5 (step S2).

When the user operates the operation unit 4 to instruct transfer of data to the game apparatus 30 (step S3: YES), the control unit 2 compares the newest day's-worth (0:00 to 24:00) of information on the identified action pattern stored in the storage unit 5 and information on the reference action pattern stored in the storage unit 5 so as to calculate the degree of matching therebetween (step S4). If there is no instruction to transfer data (step S3: NO), the processing for activity amount measurement and activity identification continues to be performed.

Upon calculating the degree of matching in step S4, the control unit 2 transfers information on the calculated degree of matching and the newest one-day's worth of information on the activity amount stored in the storage unit 5 to the game apparatus 30 (step S5).

The game control unit 32 of the game apparatus 30 acquires the information on the activity amount and the information on the degree of matching transferred from the operation information measurement apparatus 10, via the communication unit 31 (step S6).

Next, the game control unit 32 sets the growth rate of the character, which is the parameter of the electronic game, to a larger value the larger the acquired activity amount is (step S7).

Thereafter, the game control unit 32 multiplies the acquired degree of matching by the parameter (growth rate) set in step S7 to correct the parameter (step S8), and advances the electronic game in accordance with the corrected parameter.

As described above, with the system 100, the game control unit 32 sets the parameter of the electronic game to a value that is more advantageous for game advancement the larger the activity amount of the user of the operation information measurement apparatus 10 is. For this reason, in order to win the electronic game, the user will perform activities such as exercising and conversing with people as much as he or she can. Accordingly, it is possible to promote activity to the user, and to support the healthy lifestyle of the user.

Also, with the system 100, even if the activity amount of the user of the operation information measurement apparatus 10 is large, if the degree of matching between the action pattern of the user and the reference action pattern is low, the parameter of the electronic game is set in a direction that is not advantageous to game advancement. For this reason, in order to win the electronic game, the user will make an effort to keep his or her lifestyle near the reference action pattern. Accordingly, if the user is a child, the child will naturally lead a lifestyle determined in advance by his or her parents or the like, and it is possible to support the normal growth of the child.

Note that in the description above, the operation information measurement apparatus 10 generates the degree of matching, but it is also possible to use a configuration in which the game control unit 32 generates the degree of matching.

In such a case, the control unit 2 of the operation information measurement apparatus 10 has a configuration in which the degree matching calculation unit 22 is removed in FIG. 3. Also, the transfer unit 23 is configured to transfer information on the activity amount and information on the pattern of the actions of the user identified by the action identification unit 21 to the game control unit 32. Furthermore, a configuration is used in which the information on the reference action pattern is registered in advance in a storage unit (not shown) of the game apparatus 30.

The game control unit 32 compares the user's action pattern based on information indicating the pattern of actions transferred from the operation information measurement apparatus 10 and the reference action pattern that was registered in advance, and calculates the degree of matching therebetween. Then, the game control unit 32 controls the parameter of the electronic game based on the transferred activity amount and the calculated degree of matching.

This makes it possible to reduce the amount of processing of the operation information measurement apparatus 10 and makes it possible to extend battery life.

As the specific actions included in the reference action pattern, various actions can be set according to the will of the user or the user's family. For example, activities such as reading, playing, and bathing may be set thereas.

From the viewpoint of supporting the user's healthy lifestyle and growth, the specific action preferably includes at least "sleeping". Also, from the viewpoint of supporting the growth of the user, the specific action preferably includes at least "studying". As shown in FIGS. 2A and 2B, including "sleeping" and "studying" as specific actions is most preferable when considering the growth of a child, for example.

It is possible to use a configuration in which the function of the game control unit 32 of the game apparatus 30 described above is included in the control unit 2 of the operation information measurement apparatus 10. Accordingly, the game can be enjoyed using the operation information measurement apparatus 10 alone.

A program for causing a computer to function as the activity amount measurement unit 20, the action identification unit 21, the matching degree calculation unit 22, and the transfer unit 23 of the operation information measurement apparatus 10 and a program for causing a computer to function as the game control unit 32 can be provided by being recorded in a computer-readable non-transitory recording medium.

Examples of such a "computer-readable recording medium" include optical mediums such as a CD-ROM (Compact Disc-ROM), and magnetic recording mediums such as a memory card. Also, such a program can be provided by downloading via a network.

The embodiments described above are to be understood as being in all ways exemplary and in no way limiting. The scope of the present invention is defined not by the above description, but by the scope of the appended claims, and all changes which come within the meaning and range of equivalency of the scope of the claims are intended to be included therein as well.

As described above, the present specification discloses the following items.

The disclosed operation information measurement apparatus includes: a detection unit configured to detect information corresponding to a motion of a user; an activity amount measurement unit configured to measure an activity amount of the user; an action identification unit configured to identify an action of the user based on the information detected by the detection unit; and a transfer unit configured to transfer pattern information relating to a pattern of the action of the user identified by the action identification unit and the activity amount of the user measured by the activity amount measurement unit to a game control unit configured to control a parameter of an electronic game based on the activity amount and the pattern information.

In the disclosed operation information measurement apparatus, the transfer unit transfers information on a degree of matching between the pattern of the action identified by the action identification unit and a reference action pattern as the pattern information, and based on the degree of matching, the game control unit corrects the parameter of the electronic game determined according to the activity amount.

In the disclosed operation information measurement apparatus, the game control unit corrects the determined parameter to a value that is more advantageous to advancement of the electronic game the higher the degree of matching is.

The disclosed operation information measurement apparatus further includes a matching degree calculation unit configured to calculate the degree of matching in accordance with an overlap amount between a period of a specific action included in the reference action pattern and a period of the specific action included in the pattern of the action identified by the action identification unit.

In the disclosed operation information measurement apparatus, the specific action includes at least one of sleeping and studying.

The disclosed operation information measurement apparatus further includes a sound detection unit configured to detect sound, and the activity amount measurement unit measures a conversation amount of the user as the activity amount by analyzing voice information detected by the sound detection unit.

The disclosed operation information measurement apparatus further includes the game control unit.

The disclosed game control program is a program for causing a computer to function as the game control unit.

The disclosed operation information measurement program is a program for causing a computer to function as the activity amount measurement unit, the action identification unit, and the transfer unit in the operation information measurement apparatus.

INDUSTRIAL APPLICABILITY

According to the present invention, it is possible to provide an operation information measurement apparatus that can improve a user's desire for activity, and promote a regular lifestyle to the user.

While the present invention has been described with reference to specific embodiments, the present invention is not limited to these embodiments, and many variations and modifications can be made without departing from the technical idea of the disclosed invention.

The present application claims the benefit of Japanese Patent Application 2014-175836 filed on Aug. 29, 2014, which is hereby incorporated herein in its entirety.

REFERENCE SIGNS LIST

10 Operation information measurement apparatus
1 Detection unit
2 Control unit
3 Communication unit
7 Sound detection unit
20 Activity amount measurement unit
21 Action identification unit
22 Matching degree calculation unit
23 Transfer unit
30 Game apparatus
31 Communication unit
32 Game control unit
33 Display unit

The invention claimed is:

1. An operation information measurement apparatus having a game processor with a game parameter for controlling a game progress, the operation information measurement apparatus comprising:
    a detector, including an acceleration sensor, configured to detect a motion of a user;
    a memory storing a first reference action pattern for sleeping during a predetermined period of time and a second reference action pattern for studying during the predetermined period of time; and
    a data processor configured to conduct following functions:
        identifying an action pattern of sleeping of the user during the predetermined period of time based on the motion detected by the detector;
        identifying an action pattern of studying of the user during the predetermined period of time based on the motion detected by the detector;
        calculating a degree of sleep matching in time overlap manner between the identified action pattern of sleeping and the reference action patter for sleeping;
        calculating a degree of study matching in time overlap manner between the identified action pattern of studying and the reference action patter for studying; and
        transferring the degree of sleep matching and the degree of study matching to the game processor, whereby the game parameter is varied based on the degree of sleep matching and the degree of study matching.

2. The operation information measurement apparatus according to claim 1, wherein the game processor and the data processor are both provided in a hardware processor.

3. The operation information measurement apparatus according to claim 1, wherein the game processor and the data processor are respectively provided in different hardware processors.

4. The operation information measurement apparatus according to claim 1, further comprising an activity amount detector configured to measure an activity amount of the user.

5. The operation information measurement apparatus according to claim 4, wherein the data processor further transfers the measured activity amount of the user such that the game parameter is varied based on the measured activity amount of the user.

6. The operation information measurement apparatus according to claim 1, further comprising a sound detector.

7. The operation information measurement apparatus according to claim 1, wherein the predetermined period of time is a day.

* * * * *